Figure 1:
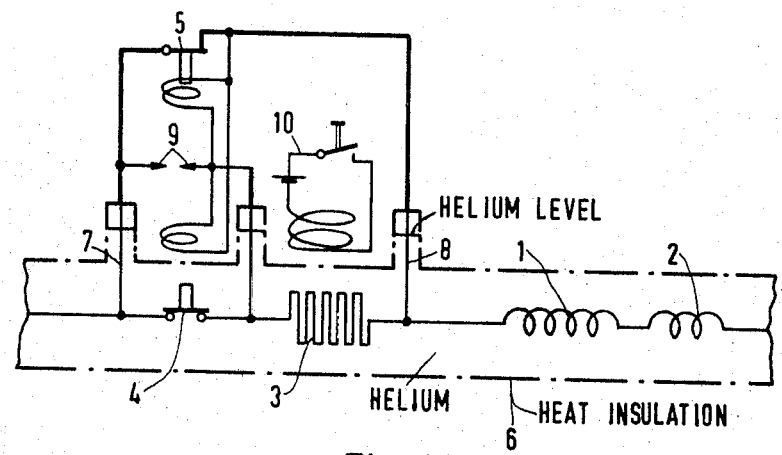

United States Patent Office 3,453,449
Patented July 1, 1969

3,453,449
ELECTRICAL POWER TRANSMISSION WITH SUPERCONDUCTING POWER CABLES
Wilhelm Kafka, Tennenlohe, Germany, assignor to Siemens Aktiengesellschaft, Erlangen, Germany, a corporation of Germany
Filed Aug. 30, 1966, Ser. No. 576,050
Claims priority, application Germany, Aug. 31, 1965, S 99,150
Int. Cl. H03k *17/00, 3/38;* H01b *7/34*
U.S. Cl. 307—245                        10 Claims My invention relates to the transmission of electrical power in a system which includes superconducting power cables.

By using superconductors, it is possible to provide systems for transmitting very high power with low losses. Superconducting cables are capable of transmitting direct current without any losses. It is only required to carry off the heat which might otherwise have access to the superconducting cables from the outer atmosphere, and by using a good heat-insulating structure less power is required than consumed by the resistance losses of high power conductors situated in the open air. Transmission of direct current by way of superconducting cables is provided with machines having superconducting coils connected to the superconducting cables and operating without any temperature differential between the coils and cables, so that at these locations no heat is transferred to the cables. These superconducting machines can in and of themselves be built so as to have very low losses. In order to protect the cables and machines, particularly when there are a number of feed-ins to the power network, it is necessary to be able to disconnect the cable from the circuit. The switching structure which makes such disconnection possible is required to operate in such a way that no appreciable heat is transmitted to the circuit which is at the extremely low temperature.

It is already known to provide a switch structure for superconducting power cables according to which the cable includes a superconductor section which is high-ohmic in its normal conducting state and which is capable of transition from superconducting-to-normal states, the power cable also being provided with a superconducting disconnect switch connected in series with the latter superconductor section thereof. The superconductor section of the superconducting cable in this case is made up of a thin lead film having a length of approximately 10 km. and this film is folded and undergoes transition from the superconducting to the normal state as the result of the action of a magnetic field. The switch energy is consumed in the superconductor section of the cable and is carried off in the cooling liquid.

It is a primary object of my invention to provide a more economical switch structure for superconducting power cables.

In accordance with my invention, the known structure is improved by providing a power disconnect switch situated in an atmosphere which is at room temperature and connecting the latter disconnect switch in parallel at least with the superconductor section of the superconducting power cable.

In this way it is posible to commutate the current which is to be shut off into a circuit which is at room temperature and then to interrupt this circuit. The switch energy is in this way released at room temperature and can be carried away without any difficulty. Inasmuch as the normal conducting branch of the circuit, in which the power disconnect switch is located, is loaded only for very short periods of time, which is to say only when actuated to open the circuit, it can be designed for a much higher current density than for a permanent current. Because of this possibility use can be made in particular of the lead-in points to the heat insulation to maintain heat transfer to these lead-in points at a very low level.

Preferably the power disconnect switch is connected in parallel with the series-connected superconductor section of the superconducting cable and the superconducting disconnect switch, and the power disconnect switch is only opened when the current which is to be shut off commutates and the superconducting disconnect switch is open.

The superconducting disconnect switch can be provided with normal conducting spark-points. In this case the spark gap is preferably situated at the exterior of the heat-insulated enclosure which houses the super-conducting disconnect switch.

Figure 2:
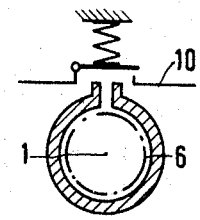

My invention is illustrated by way of example in the accompanying drawings which form part of this application and in which:

FIG. 1 schematically illustrates that part of a power network which includes the structure of my invention; and FIG. 2 is a schematic illustration of an overload relay.

FIG. 1 shows a part of the power system which includes a machine having the symbolically illustrated line inductance 1 and stationary superconducting coil 2. This machine is to be turned off, and for this purpose there are included in the superconductors of the circuit a superconducting section 3 of the cable capable of transition between superconducting and normal conducting states and in series with the latter a superconducting disconnect switch 4. A power disconnect switch 5 which is situated in an atmosphere which is at room temperature is connected in parallel with the series-connected super-conductor section 3 and superconducting disconnect switch 4. This power disconnect switch can take the form of a quick-operating switch having an arc situated in air or in an atmosphere of sulphur hexafluoride. The superconducting disconnect switch 4 and the superconductor section 3 are situated in an enclosure provided with heat-insulation 6 and housing the switch 4 and conductor section 3, this enclosure maintaining the the components therein at the superconducting temperature such as, for example, at the temperature of evaporating helium. FIG. 1 shows the helium within the enclosure in a schematic manner, and the helium level is also illustrated. Inasmuch as the power disconnect switch 5 is required to conduct current only for a period of 10 to 100 ms., its copper conductors and contact elements can be designed for substantially higher current densities than in the case of a normal switch for a permanent current. Particularly high current densities are provided for the current flow at the lead-in points 7 and 8 through the heat insulation where a greater temperature gradient occurs, so that in this way transfer of heat from the exterior during normal operation is maintained at a low level. Preferably the lead-in points 7 and 8 are specially cooled by helium gas and/or liquid nitrogen.

The superconducting disconnect switch 4, which is required to interrupt the residual current of the superconductor section 3 at low voltage but which after actuation of the power disconnect switch 5 is required to block the full line voltage, can be made of a soft or hard superconducting contact bridge situated in the liquid helium and actuated either by a magnetic drive or pneumatically. In the example illustrated in FIG. 1, the disconnect switch 4 is capable of being actuated by the magnet coil situated thereover, as illustrated. The potential at the superconductor section 3 provides the exciting voltage for this magnet coil. The control circuit 10 can provide for transition of the section 3 to the normal conducting state in which case there is a voltage drop at the section 3. This voltage can also be used for actuating the power disconnect switch 5. Therefore, there is also shown in the illustrated example a magnet coil coacting with the switch 5, this latter magnet coil being excited by the voltage at the superconductor section 3.

It is to be noted that since the wire cross section for the part of the circuit situated outside of the enclosure insulated by the heat-insulation 6 and in which the power disconnect switch 5 is located, is substantially greater than the cross section of the superconducting portion of the circuit in the heat-insulated enclosure, a heavier line is used to illustrate the conductors outside of the heat-insulated enclosure. The transition between the large and small cross sections of the conductors will as a rule be continuous and gradual, as indicated in FIG. 1.

Normally conducting spark points 9 are provided in parallel with the contact bridges, and the spark gap is preferably situated outwardly beyond the heat-insulation 6.

The superconductor section 3 is made up, for example, of a bifilar folded band of lead whose normal resistance at the operating temperature as a result of the mean free path is substantially greater than that of pure lead. Thus, the superconductor section 3 can have a fibrous, layered or foam construction which will provide for the electrons in the normal conducting state a mean free path smaller than that of the initial material used for the superconductor section, which is to say, smaller than that of pure lead. This means free path effect is described at pages 62–65 and page 108 of "Applied Superconductivity" by Vernon L. Newhouse, published by John Wiley & Sons, Inc., New York, in 1964.

The lattice irregularities which limit the mean free path of the electrons can be provided, for example, by placing upon each other a large number of extremely thin lead foils with the finest insulating powder, made of magnesium or aluminum oxide, situated between these foils, whereupon the assembly is brought down to a small percent of its original thickness by rolling or pressing. In order to provide connections at the ends of this band to the other superconductors of the circuit, the cross section of the band ends is increased by widening these ends and/or increasing the thickness thereof considerably. Furthermore, these ends can be provided with special cooling surfaces. In this way when the superconductor section 3 undergoes transition to the normal conducting state, similar transition of adjoining superconductors is prevented. This transition to the normal conducting state can take place at one or more parts of the entire band. One possibility for such transition to the normal conducting state is provided by way of the control circuit 10 by means of which it is possible to achieve a magnetic field which provides transition of the superconductor section 3 into the normal conducting state. This localized transition spreads as a result of the heating from the not yet fully commutated current in a rapid manner and the ohmic resistance increases until only a small residual current flows through the section 3. This latter flow is now interrupted by the superconducting disconnect switch 4. Thereafter the power disconnect switch 5 opens. If a hard superconducting material such as, for example, an intermetallic compound of niobium tin or niobium nitride, is used for the superconductor section 3, then the transmission can be brought about by way of a heat impulse.

As an example of the dimensions of the superconductor section 3, it may be assumed that a network section having a direct current power transmission of 100 mw. at 10 kv. and 10 ka. is to be turned off. For 10 ka. at a current density of $2 \times 10^5$ a. per cm.$^2$, a cross section of 5 mm.$^2$ of niobium-titanium alloy is sufficient. The cable, therefore, can be formed, for example, from 100 individual wires each having a diameter of 0.25 mm., these wires being twisted into a cable of approximately 5 mm. diameter. The critical field intensity at the outer periphery of the cable is then less than 8 koe. Approximately the same cross section is required for the superconducting disconnect switch 4. For this purpose it is possible to use a massive band of, for example, a width of 10 mm. and a thickness of 0.5 mm. The superconductor section 3 is made, for example, of a mixture of lead and magnesium oxide in a volume ratio of 1:1 with a cross section of 2 mm.$^2$ and a specific resistance at 10° K. of approximately $10^{-4}$ $\Omega$cm. The resistance value per centimeter of band length is then $0.5 \times 10^{-2} \Omega$. At 10 ka. there will be at each centimeter of the band a voltage of 50 volts. When the voltage drop of the current circuit in which the power disconnect switch 5 is located is on the order of 10 v., for example, and the residual current which is to be turned off by the superconducting disconnect switch 4 is to be at a maximum of 1 a., the superconductor section 3 must have a length of 2000 cm. If a band width of 20 mm. is selected and a band thickness of 0.1 mm., then such a band can be folded 20 times up to a length of 100 cm. with a total thickness including the insulation between the layers, of approximately 10 mm. For layer insulation thin mica foil, for example, is suitable. In order to provide, during blocking operation, a sufficiently rapid spreading of the normal conducting state throughout the entire band length, the heat impulse can be provided at all 20 layers by means of electrical heating introduced between the layers.

The actuation of the power disconnect switch 5 and the superconducting disconnect switch 4 can be made dependent upon the voltage at the superconductor section 3 during blocking operation.

Also, an overload relay can be provided which upon short circuiting in the power circuit automatically releases the switching structure as soon as the critical current intensity at the superconductor section 3 is exceeded. Thus, referring to FIG. 2, it will be seen that the overload relay can take the form of a magnet ring which extends around the heat-insulation 6 and thus encloses the superconductor 1. In accordance with the particular current in the superconductor, therefore, there will be a more or less intense magnetic flux, and the contact bridge in the switch circuit 10 will be attracted to a greater or lesser degree. When the limiting value is reached the switch of the circuit 10 closes and thus produces transition of the superconductor section 3 into the normal conducting state. FIG. 2 shows a tension spring situated above the contact bridge and tending to displace it to its open position in opposition to the action of the magnet.

The switch structure of the invention can be used either in direct or in alternating current systems.

I claim:

1. In an electrical power transmission system, a superconducting power cable having a superconductor section which is high-ohmic in its normal conducting state and which can undergo transition from superconducting-to-normal conducting states, a superconducting disconnect switch connected in series with said superconductor section of said superconducting cable, and a power disconnect switch situated in an atmosphere which at room temperature and connected in parallel at least with said superconductor section of said superconducting power cable.

2. The combination of claim 1 and wherein said power disconnect switch is connected in parallel with the series-connected superconductor section and superconducting disconnect switch.

3. The combination of claim 1 and wherein a heat-insulated enclosure houses said superconducting disconnect switch, and normal-conducting spark-points operatively connected with said superconducting disconnect switch and located outwardly beyond said heat-insulated enclosure.

4. The combination of claim 1 and wherein said superconductor section of said superconducting cable is in the form of a superconductor which has a construction which in its normal conducting state provides for its electrons a mean free path which is smaller than that of the electrons of the initial material used for said superconducting section of said power cable.

5. The combination of claim 4 and wherein said superconductor section of said cable has a fibrous construction.

6. The combination of claim 4 and wherein said superconductor section has a layered construction.

7. The combination of claim 4 and wherein said superconductor section has a foam structure.

8. The combination of claim 1 and wherein said power disconnect switch is connected in parallel with the series-connected superconductor section and superconducting disconnect switch, a heat-insulated enclosure housing said superconducting disconnect switch, and spark-points operatively connected with said superconducting disconnect switch.

9. The combination of claim 8 and wherein said spark-points are situated at the exterior of said enclosure.

10. The combination of claim 1 and wherein an overload relay means coacts with said superconductor section of said superconducting cable for automatically placing said superconductor section in a normal conducting state when a critical intensity of current flowing therethrough is exceeded.

References Cited

UNITED STATES PATENTS

| | | | |
|---|---|---|---|
| 3,162,716 | 12/1964 | Silver | 174—15 |
| 3,343,035 | 9/1967 | Garwin | 333—99 X |

DONALD D. FORRER, *Primary Examiner.*

U.S. Cl. X.R.

174—15; 307—306; 317—13, 123; 335—216